(12) United States Patent
Shimonek et al.

(10) Patent No.: US 9,838,202 B2
(45) Date of Patent: Dec. 5, 2017

(54) MODIFYING A CONTENT DESCRIPTOR TO FACILITATE DELIVERY OF TOKEN-AUTHORIZED ENCRYPTED DATA

(71) Applicant: Microsoft Technology Licensing, LLC, Redmond, WA (US)

(72) Inventors: Douglas Charles Shimonek, New Brighton, MN (US); Dawei Wei, Bothell, WA (US); Steven C. Peterson, Bloomington, MN (US); Mingfei Yan, Bellevue, WA (US); Ashish Chawla, Redmond, WA (US); Vishal Sood, Bothell, WA (US); Quintin Swayne Burns, Charlotte, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 144 days.

(21) Appl. No.: 14/840,324

(22) Filed: Aug. 31, 2015

(65) Prior Publication Data
US 2017/0060776 A1  Mar. 2, 2017

(51) Int. Cl.
*G06F 11/00* (2006.01)
*H04L 9/08* (2006.01)

(52) U.S. Cl.
CPC .... *H04L 9/0816* (2013.01); *G06F 2212/1052* (2013.01); *H04L 2209/24* (2013.01)

(58) Field of Classification Search
CPC ......... G06F 12/1408; G06F 2212/1052; H04L 9/0816; H04L 2209/24
USPC ....................................................... 713/193
See application file for complete search history.

(56) References Cited

U.S. PATENT DOCUMENTS

| 8,769,614 | B1 | 7/2014 | Knox et al. |
| 8,984,285 | B1 | 3/2015 | Dorwin et al. |
| 9,026,782 | B2 | 5/2015 | Ahuja et al. |
| 2005/0203853 | A1 | 9/2005 | Yamamoto et al. |
| 2007/0011097 | A1* | 1/2007 | Eckleder ................. G06F 21/10 705/59 |
| 2012/0096526 | A1 | 4/2012 | Brahmanapalli et al. |
| 2012/0170741 | A1* | 7/2012 | Chen .................. H04L 63/0428 380/210 |
| 2013/0238896 | A1* | 9/2013 | Pedlow, Jr. ............. G06F 21/10 713/156 |
| 2013/0283033 | A1* | 10/2013 | Ahuja .................. H04L 9/3213 713/150 |
| 2014/0115724 | A1 | 4/2014 | van Brandenburg et al. |
| 2014/0280781 | A1 | 9/2014 | Gregotski |
| 2014/0281481 | A1 | 9/2014 | Moroney |
| 2014/0351871 | A1 | 11/2014 | Bomfim et al. |

(Continued)

OTHER PUBLICATIONS

"Session Based Encryption", Retrieved on: Jun. 4, 2015 Available at: http://www.cisco.com/c/en/us/td/docs/video/cds/cda/is/3_2/configuration_guide/ISCDS3-2config/ABRsessionEncryption.html#pgfId-1251307, 9 pages.

(Continued)

*Primary Examiner* — Mohammad W Reza
(74) *Attorney, Agent, or Firm* — Dicke, Billig & Czaja, PLLC

(57) ABSTRACT

Described herein are various technologies pertaining to delivery of token-authenticated encrypted data. Content descriptor(s) (e.g., playlist(s)) can be modified to facilitate exchange of a token for a decryption key for browser(s) that do not provide logic to manage a flow of the token.

16 Claims, 7 Drawing Sheets

(56) References Cited

U.S. PATENT DOCUMENTS

| | | |
|---|---|---|
| 2015/0088965 A1 | 3/2015 | Pakulski et al. |
| 2015/0121484 A1 | 4/2015 | Liu et al. |
| 2015/0150038 A1 | 5/2015 | Hao et al. |
| 2016/0127334 A1* | 5/2016 | Bangole .............. H04L 63/0428 713/171 |

OTHER PUBLICATIONS

Hernandez, Pedro, "Microsoft Launches PlayReady Encrypted Live Streaming", Published on: Dec. 23, 2014 Available at:, http://www.eweek.com/enterprise-apps/microsoft-launches-playready-encrypted-live-streaming.html, 6 pages.

Yan, Mingfei, "How to make Token Authorized AES Encrypted HLS Stream Working in Safari", Published on: Mar. 6, 2015 Available at: http://azure.microsoft.com/blog/2015/03/06/how-to-make-token-authorized-aes-encrypted-hls-stream-working-in-safari/, 5 pages.

Yan, Mingfei, "GitHub", Published on: Mar. 6, 2015 Available at: https://github.com/AzureMediaServicesSamples/AESHLSSafari/blob/master/ManifestProxyController.cs, 2 pages.

"HTTP Live Streaming Overview", Apple, Inc., 2014, 39 pages.

"Example Playlist Files for use with HTTP Live Streaming", Technical Note TN2288, Apple, Inc., 2012, last retrieved on Aug. 28, 2015, 20 pages.

\* cited by examiner

MODIFYING A CONTENT DESCRIPTOR TO FACILITATE DELIVERY OF TOKEN-AUTHORIZED ENCRYPTED DATA

BACKGROUND

Encryption of data on computer systems can be utilized to prevent unauthorized access to the data. An enterprise may encrypt data (e.g., video and/or audio) to limit access of the data to particular users and/or class(es) of users. Further, data may be encrypted to protect the data from unauthorized access during transit. For example, an entity may encrypt data related to streaming of a live broadcast of a corporate event and desire to have only employees of the entity be able to access the stream. In another example, an entity may encrypt data related to streaming of a live broadcast of a sporting event and limit access to the stream event to users that have paid a subscription fee.

Authorization techniques are useful to allow content owner(s) to specify rule(s) regarding authorizing and/or denying access to content. A token is one example of an authorization technique. The token can be employed in order to limit access (e.g., time-based) to encrypted data. The token can be provided based upon successful authentication of credential(s) presented by a client application such as a media player. The token can be provided to a key service that, upon successful verification of the provided token, returns a decryption key that can be utilized to decrypt the encrypted data. For example, the token can have claim(s) that can be validated again configuration rules stored in the key service and utilized by the key service to grant or deny access to decryption key(s).

SUMMARY

Described herein is a system comprising a second content descriptor modification component that is configured to receive a request, the request comprising a token used to retrieve a decryption key to decrypt an encrypted data and an identifier of a content descriptor. The second content descriptor modification component is further configured to retrieve the content descriptor based upon the request. The content descriptor comprises an identifier of the encrypted media data. The second content descriptor modification component is further configured to modify the content descriptor by adding a reference to a key service to obtain a key to decrypt the encrypted data with the token embedded as a parameter to be provided to the key service to obtain the key.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
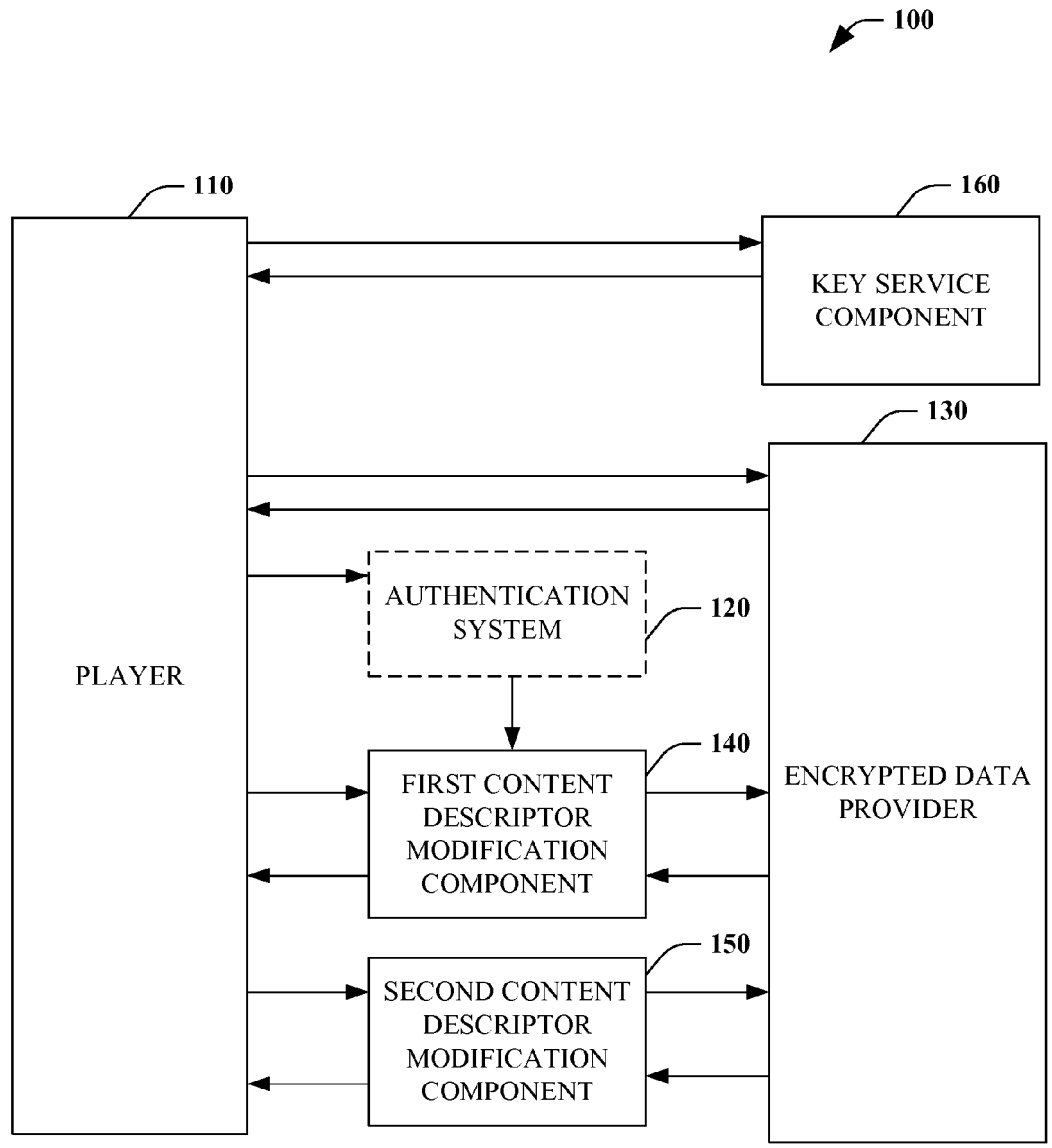
FIG. 1 illustrates an exemplary system for delivery of token-authenticated encrypted data.

Various technologies pertaining to token-authenticated encrypted data are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding modification of content descriptor(s) (e.g., playlist(s)) to facilitate delivery of token-authorized encrypted data for player(s) that do not provide logic to manage a flow of a token needed to retrieve a decryption key. What follows are one or more exemplary systems and methods.

Aspects of the subject disclosure pertain to the technical problem of delivery of token-authenticated encrypted data in an environment that does not have logic to manage a flow of a token needed to retrieve a decryption key. The technical features associated with addressing this problem involve modifying a top level content descriptor (e.g., playlist) to reference a service endpoint (e.g., proxy server) and a token used to retrieve the decryption key. Accordingly, aspects of these technical features exhibit technical effects with respect to facilitating cross-platform viewing of encrypted content and increasing technical compatibility between systems, thereby increasing possible distribution of content.

A player can access the modified top level content descriptor to send a request for a second level content descriptor (e.g., playlist), the request comprising a token used to retrieve the decryption key. The second level content descriptor having an identifier of the encrypted data can be modified by adding a reference to a key service to obtain the decryption key with the token embedded as a parameter to be passed to the key service to obtain the key. For example, the token can be unique for the player to access the key service to obtain they key on behalf of a requesting user. This modified second level content descriptor can be provided to the player.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

With reference now to FIG. 1, a system 100 for delivery of token-authenticated encrypted data in accordance with aspects of the subject matter described herein. All or portions of system 100 may reside on one or more computers or computing devices such as the computers described below with respect to FIG. 7. System 100 or portions thereof may be provided as a stand-alone system or as a plug-in or add-in.

The components illustrated in FIG. 1 are exemplary and are not meant to be all-inclusive of components that may be needed or included. Furthermore, the number of components may differ in other embodiments without departing from the spirit or scope of aspects of the subject matter described herein. In some embodiments, the components described in conjunction with FIG. 1 may be included in other components (shown or not shown) or placed in subcomponents without departing from the spirit or scope of aspects of the subject matter described herein. In some embodiments, the components and/or functions described in conjunction with FIG. 1 may be distributed across multiple devices.

System 100 can include one or more players 110 executing on computing devices. Player 110 is a component that is configured to present received information associated with a presentation (e.g., to a user) including, for example, audio, video and/or other information about the presentation. Contemplated computing devices include but are not limited to desktop computers, tablet computers, laptop computers, notebook computers, personal digital assistants, smart phones, cellular telephones, mobile telephones, smart televisions, and so on. A computing device can include one or more processors and a memory such as memory that communicates with the one or more processors. For example, player 110 can be embedded within a browser and/or an application executing on a computing device.

System 100 can, optionally, include an authentication system 120 that provides a token in response to successful authentication of credential(s) associated with the player 110 and/or a user of the player 110. "Token" includes various configurations of information, data and/or claim(s) used to realize a right to access particular encrypted data accessible via an encrypted data provider 130. For example, the token can be time-based thus allowing for temporally limited access to the encrypted data (e.g., expiration of token).

Data stored on the encrypted data provider 130 can be encrypted using a keyed transformation function, for example, a cryptographic engine, a symmetric key cryptographic function, a cryptographic function in accordance with the Advanced Encryption Standard (AES), or the like. Data stored on the encrypted data provider 130 can include audio, video and/or other information about a presentation. For example, information about a presentation can include an audio index, closed-captioning information, audio converted to text, images and/or selective contextual information (e.g., selecting a viewpoint of a plurality of viewpoints for a particular presentation such as a camera angle).

A content descriptor can be provided to the player 110 from a first content descriptor modification component 140 and/or a second content descriptor modification component 150. Examples of content descriptors include playlists and/or manifests, as described in greater detail below. "Content descriptor" refers to metadata about a stream (e.g., associated with encrypted data). The metadata can include attribute(s) of quality(ies) of available stream(s). For example, the metadata can describe one or a plurality of available audio and/or video streams along with associated bit rates. Using the content descriptor information, the player 110 can adaptively determine which of the available stream(s) to load based, for example, on available bandwidth and/or resource(s) (e.g., memory, available processing capability and/or available computer storage). "Playlist" (also referred to herein as "playlist file") refers to a file and/or digital representation of metadata about a stream and is one example of a content descriptor.

The first content descriptor modification component 140 can receive a request for particular encrypted data (e.g., data stream) accessible via the encrypted data provider 130. In response to this request, the first content descriptor modification component 140 can request a content descriptor associated with the particular encrypted data from the encrypted data provider 130. This first content descriptor is sometimes referred to herein as the "original content descriptor." The original content descriptor (e.g., top playlist) can include identifier(s) (e.g., Uniform Resource Identifier(s) (URI(s))) of second level playlist(s)) associated with the particular encrypted data (e.g., data stream(s)).

However, recognizing (e.g., determining) that a browser associated with the player 110 does not provide logic to manage a flow of the token needed to retrieve the decryption key, the first content descriptor modification component 140 can modify the content descriptor. The content descriptor can be modified by adding a reference to a service endpoint (e.g., a proxy server by which the second content descriptor modification component 150 is accessible) and a token used to retrieve the decryption key used to decrypt the particular encrypted data. The identifier(s) included in the original content descriptor can be included as a parameter of the service endpoint provided in the modified content descriptor (e.g., top playlist). The modified content descriptor can be provided to the player 110. For example, the reference to the service endpoint and the token can be interpreted by the player 110 as a second level content descriptor.

System 100 can include a second content descriptor modification component 150 which can receive a request from the player 110. The request can be for a second level content descriptor based upon the modified content descriptor received by the player 110 from the first content descriptor modification component 140. Accordingly, the request can include the token used to retrieve the decryption key and the identifier(s) included in the original content descriptor (e.g., second playlist Uniform Resource Identifier(s) (URI(s))).

In response to receiving the request, the second content descriptor modification component 150 can retrieve the second level content descriptor from the encrypted content provider 130. However, since the browser does not provide logic to manage the flow of the token needed to retrieve the decryption key, the second content descriptor modification component 150 can modify the second level content descriptor by adding a reference to a key service component 160 along with the token used to retrieve the decryption key.

The key service component 160 can provide the decryption key to the player 110 in response to presentation of the token by the player 110. The player 110 can request the encrypted data from the encrypted data provider 130 based upon identifier(s) included in the modified second level playlist, and, utilize the decryption key to decrypt encrypted data received from the encrypted data provider 130.

In one exemplary embodiment, the first content descriptor modification component 140 and the second content descriptor modification component 150 are components of a proxy server. In a second exemplary embodiment, the first content descriptor modification component 140 and the second content descriptor modification component 150 are each components of different proxy servers.

Figure 2:
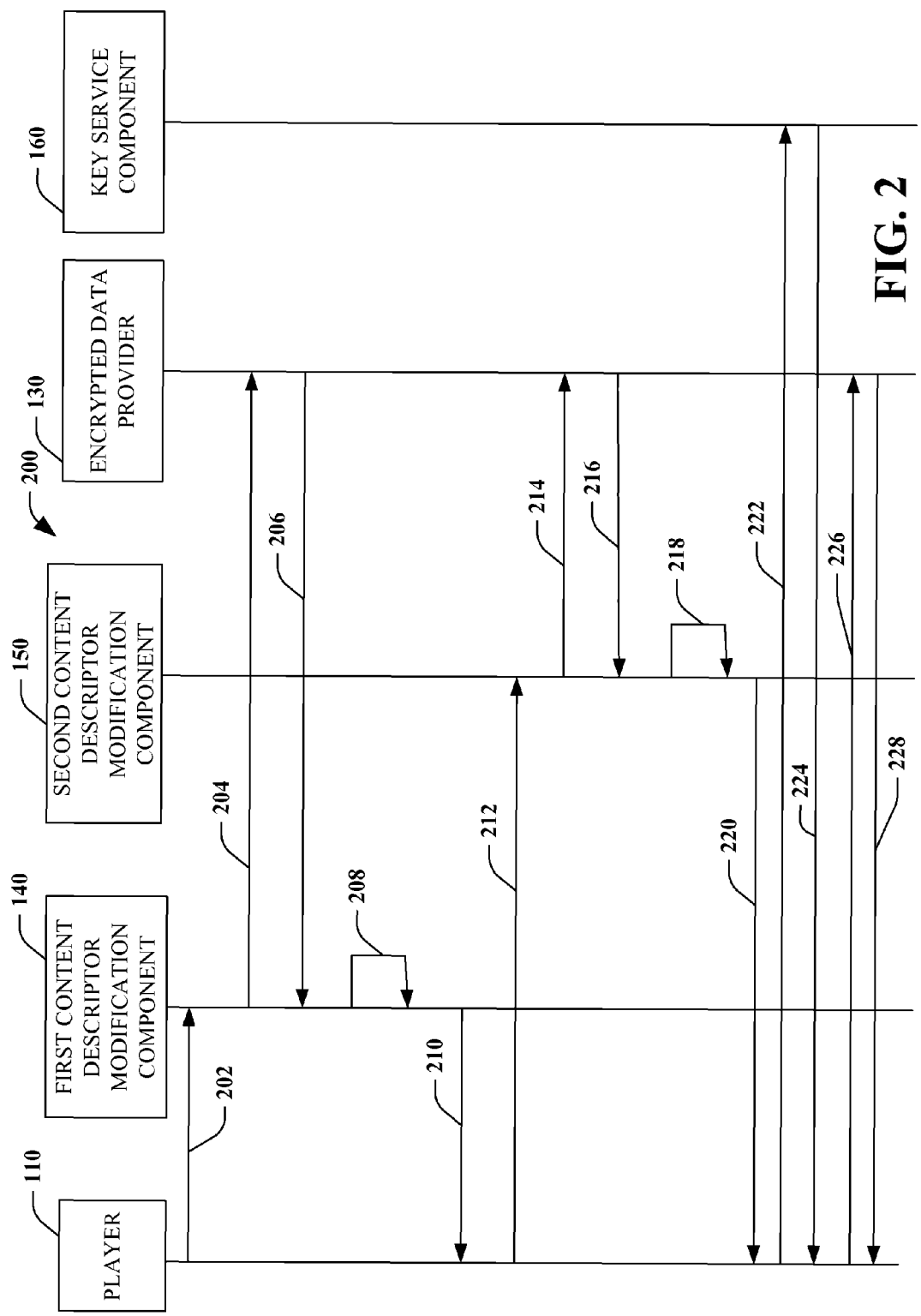
FIG. 2 is a timing sequence diagram illustrating a first exemplary embodiment.

Turning to FIG. 2, with continued reference to FIG. 1, a timing sequence diagram illustrating a first exemplary embodiment is provided. In this first exemplary embodiment, a user can utilize a browser with an embedded player (e.g., audio/video player) to navigate to a web-based portal. In this exemplary embodiment, the browser does not accept add-in(s) or the like such that the web-based portal is not able to inject code into a playback path of the browser. An example of such a browser is the Safari® browser of the Apple Corporation. In this exemplary embodiment, the browser does not provide logic to manage a flow of a token needed to retrieve a decryption key in order to decrypt encrypted data provided by the encrypted data provider 130. The token is generated by an authentication system 120 upon successful verification of credential(s) (e.g., of a user of the player 110).

A request 202 for particular encrypted data is made from the player 110 to the first content descriptor modification component 140. For example, the request 202 can include an identifier which the first content descriptor modification component 140 maps to a streaming URI available via the encrypted data provider 130.

In response to the request 202, in request 204, the first content descriptor modification component 140 requests the streaming URI from the encrypted data provider 130. The encrypted data provider 130 provides a content descriptor (e.g., top playlist) to the first content descriptor modification component 140 in response 206. An exemplary content descriptor is set forth in Table 1:

TABLE 1

EXTM3U
EXT-X-VERSION:4
EXT-X-MEDIA:TYPE=AUDIO,GROUP-
ID="audio",NAME="AAC_und_ch2_96kbps",URI="QualityLevels(9
2405)/Manifest(AAC_und_ch2_96kbps,format=m3u8-aapl)"
EXT-X-MEDIA:TYPE=AUDIO,GROUP-
ID="audio",NAME="AAC_und_ch2_56kbps",DEFAULT=YES,URI=
"QualityLevels(53017)/Manifest(AAC_und_ch2_56kbps,format=m3u8
-aapl)"
EXT-X-STREAM-
INF:BANDWIDTH=1092766,RESOLUTION=384x288,CODECS="a
vc1.4d4015,mp4a.40.2",AUDIO="audio"
QualityLevels(960870)/Manifest(video,format=m3u8-aapl)
EXT-X-STREAM-
INF:BANDWIDTH=1607960,RESOLUTION=480x360,CODECS="a
vc1.4d401e,mp4a.40.2",AUDIO="audio"
QualityLevels(1464974)/Manifest(video,format=m3u8-aapl)
EXT-X-STREAM-
INF:BANDWIDTH=62343,CODECS="mp4a.40.2",AUDIO="audio"
QualityLevels(53017)/Manifest(AAC_und_ch2_56kbps,format=m3u8-
aapl)

The exemplary content descriptor of Table 1 is set forth in Extended M3U format (e.g., .M3U8 format). However, those skilled in the art will recognize that the claimed subject matter is not limited to Extended M3U format and that the content descriptor can be in any suitable format for communicating metadata about a data stream.

Continuing with the exemplary embodiment of FIG. 2, the content descriptor (e.g., top playlist) received by the first content descriptor modification component 140 includes identifier(s) (e.g., URI(s)) of second level content descriptor(s) (e.g., playlist(s)). For example, the two tags "#EXT-X-MEDIA:TYPE" included in Table 1 refer to second level playlists.

As the player 110 does not provide logic to manage the flow of the token needed to retrieve the decryption key, at 208, the first content descriptor modification component 140 can modify the content descriptor (e.g., top level playlist). The content descriptor can be modified by adding a reference to a service endpoint (e.g., a proxy server such as the second content descriptor modification component 150) and a token used to retrieve the decryption key used to decrypt the particular encrypted data. The identifier(s) included in the original content descriptor can be included as a parameter of the service endpoint provided in the modified content descriptor (e.g., top level playlist). An exemplary modified content descriptor is set forth in Table 2:

TABLE 2

EXTM3U
EXT-X-VERSION:4
EXT-X-MEDIA:TYPE=AUDIO,GROUP-
ID="audio",NAME="AAC_und_ch2_56kbps",URI="https://test.cloud
video.azure-
int.net/api/ManifestProxy?playbackUrl=http://test.origin.mediaservices
.windows.net/fc63efd5-93b0-435e-b4ca-
50142cdbcc54/Video_asset_name.ism/QualityLevels(53017)/Manifest
(AAC_und_ch2_56kbps,format=m3u8-
aapl)&token=[PUT_YOUR_TOKEN_HERE]"
EXT-X-MEDIA:TYPE=AUDIO,GROUP-
ID="audio",NAME="AAC_und_ch2_96kbps",DEFAULT=YES,URI=
"https://proxy.cloudvideo.azure-
int.net/api/ManifestProxy?playbackUrl=http://test.origin.mediaservices
.windows.net/fc63efd5-93b0-435e-b4ca-
50142cdbcc54/Video_asset_name.ism/QualityLevels(92405)/Manifest
(AAC_und_ch2_96kbps,format=m3u8-
aapl)&token=[PUT_YOUR_TOKEN_HERE]"
EXT-X-STREAM-
INF:BANDWIDTH=1092766,RESOLUTION=384x288,CODECS="a
vc1.4d4015,mp4a.40.2",AUDIO="audio"
https://proxy.cloudvideo.azure-
int.net/api/ManifestProxy?playbackUrl=http://test.origin.mediaservices
.windows.net/fc63efd5-93b0-435e-b4ca-
50142cdbcc54/Video_asset_name.ism/QualityLevels(960870)/Manifes
t(video,format=m3u8-aapl)&token=[PUT_YOUR_TOKEN_HERE]
EXT-X-STREAM-
INF:BANDWIDTH=1607960,RESOLUTION=480x360,CODECS="a
vc1.4d401e,mp4a.40.2",AUDIO="audio"
https://proxy.cloudvideo.azure-
int.net/api/ManifestProxy?playbackUrl=http://test.origin.mediaservices
.windows.net/fc63efd5-93b0-435e-b4ca-
50142cdbcc54/Video_asset_name.ism/QualityLevels(1464974)/Manif
est(video,format=m3u8-aapl)&token=[PUT_YOUR_TOKEN_HERE]

The fields "[PUT_YOUR_TOKEN_HERE]" in Tables 2 and 3 are indicative of a field in which a token (e.g., time-based) for obtaining a decryption key that can be provided (e.g., passed) as a parameter. In the exemplary modified content descriptor set forth in Table 2, data associated with the #EXT-X-MEDIA:TYPE tags have been modified to refer to a proxy service (e.g., the second content descriptor modification component 150) that facilitates the use of a token to retrieve a decryption key instead of the second level playlist URIs set forth in the original content descriptor received from the encrypted data provider 130.

At 210, the modified content descriptor can be provided to the player 110. For example, the modified content descriptor can be read and the reference to the service endpoint and the token can be interpreted as a second level playlist by the player 110.

Next, at 212, the player 110 can send a request for the second level content descriptor (e.g., playlist) to the second content descriptor modification component 150. The request can include the token used to retrieve the decryption key and the identifier(s) included in the original content descriptor (e.g., second playlist URI(s)).

At 214, in response to the request, the second content descriptor modification component 150 can retrieve the second level playlist from the encrypted content provider 130. However, since the browser does not provide logic to manage the flow of the token needed to retrieve the decryption key, at 218, the second content descriptor modification component 150 can modify the second level playlist by adding a reference to a key service component 160 along with the token used to retrieve the decryption key. An exemplary modified second level content descriptor is set forth in Table 3:

TABLE 3

EXTM3U
EXT-X-VERSION:4
EXT-X-ALLOW-CACHE:NO
EXT-X-MEDIA-SEQUENCE:0
EXT-X-TARGETDURATION:10
EXT-X-KEY:METHOD=AES-
128,URI="https://test.keydelivery.mediaservices.windows.net/?kid=a9
9263cd-43b3-490a-a4d6-
ea04d4645fb7&token=[PUT_YOUR_TOKEN_HERE]
EXT-X-PROGRAM-DATE-TIME:1970-01-01T00:00:00Z
EXTINF:3.947392,no-desc
http://test.origin.mediaservices.windows.net/fc63efd5-93b0-435e-
b4ca-
50142cdbcc54/Video_asset_name.ism/QualityLevels(92405)/Fragment
s(AAC_und_ch2_96kbps=0,format=m3u8-aapl)
EXT-X-ENDLIST In the modified second level content descriptor of Table 3, the tag "#EXT-X-KEY" indicates an identifier of a key delivery service which returns a decryption key upon presentation of a valid token. The modified second level content descriptor further includes an identifier of the second level content descriptor (e.g., URI).

At 220, the modified second level playlist can be provided to the player 110 by the second content descriptor modification component 150. At 222, the player 110 can send a request for the decryption key to the key service component 160. The request can include the token provided to the player 110 in the modified second level content descriptor.

At 224, the key service component 160 can provide the decryption key to the player 110. At 226, the player 110 can request the encrypted data from the encrypted data provider 130 based upon identifier(s) included in the modified second level playlist, and, at 228 receive the encrypted data from the encrypted data provider 130. The player 110 can utilize the decryption key to decrypt the received encrypted data.

While the encrypted data has been described herein as audio and/or video, the subject application is not limited to such encrypted content. Those skilled in the art will recognize that "encrypted data" refers to any data that has been encrypted.

Figure 3:
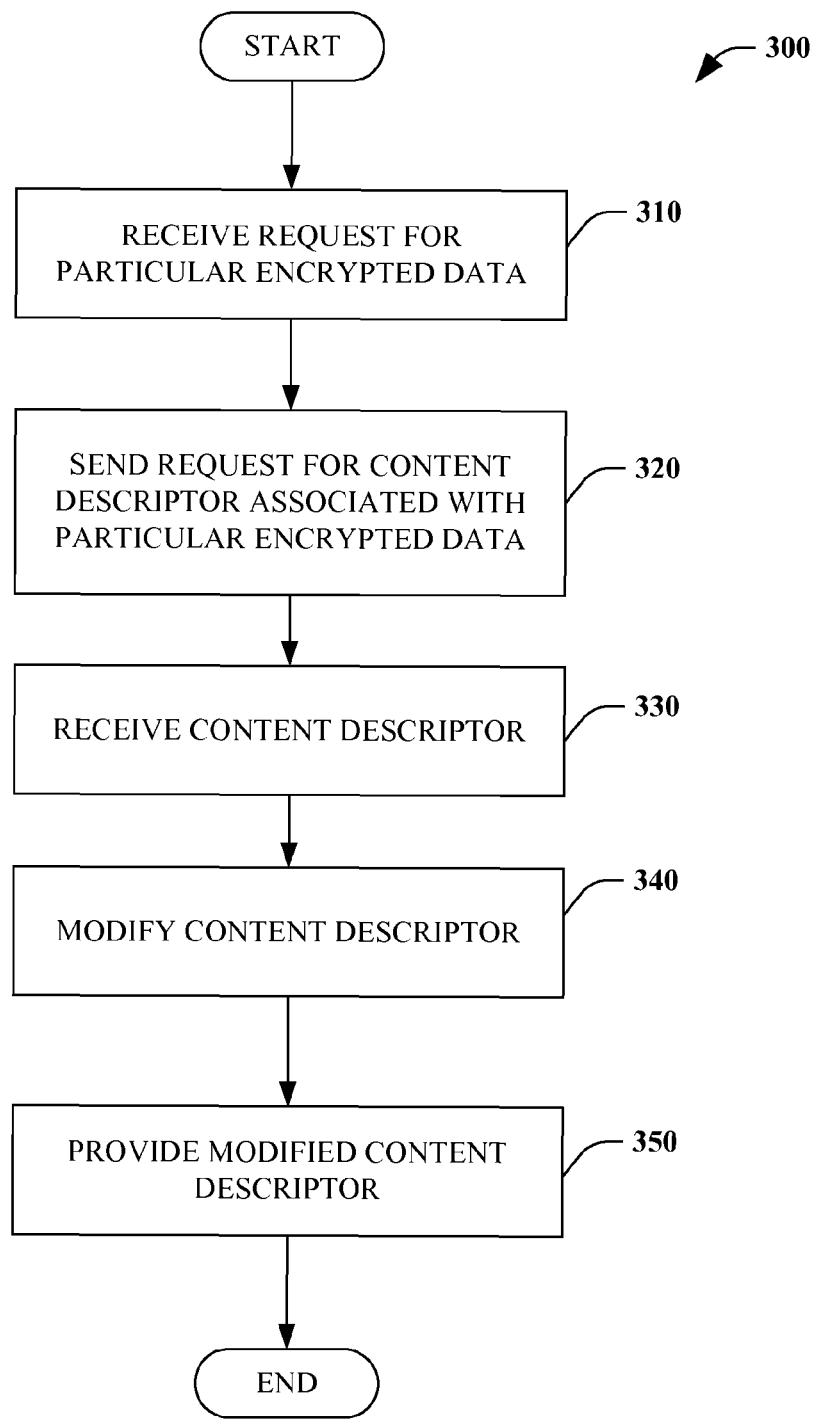
FIG. 3 is a flow diagram that illustrates an exemplary methodology of modifying a content descriptor.
Figure 4:
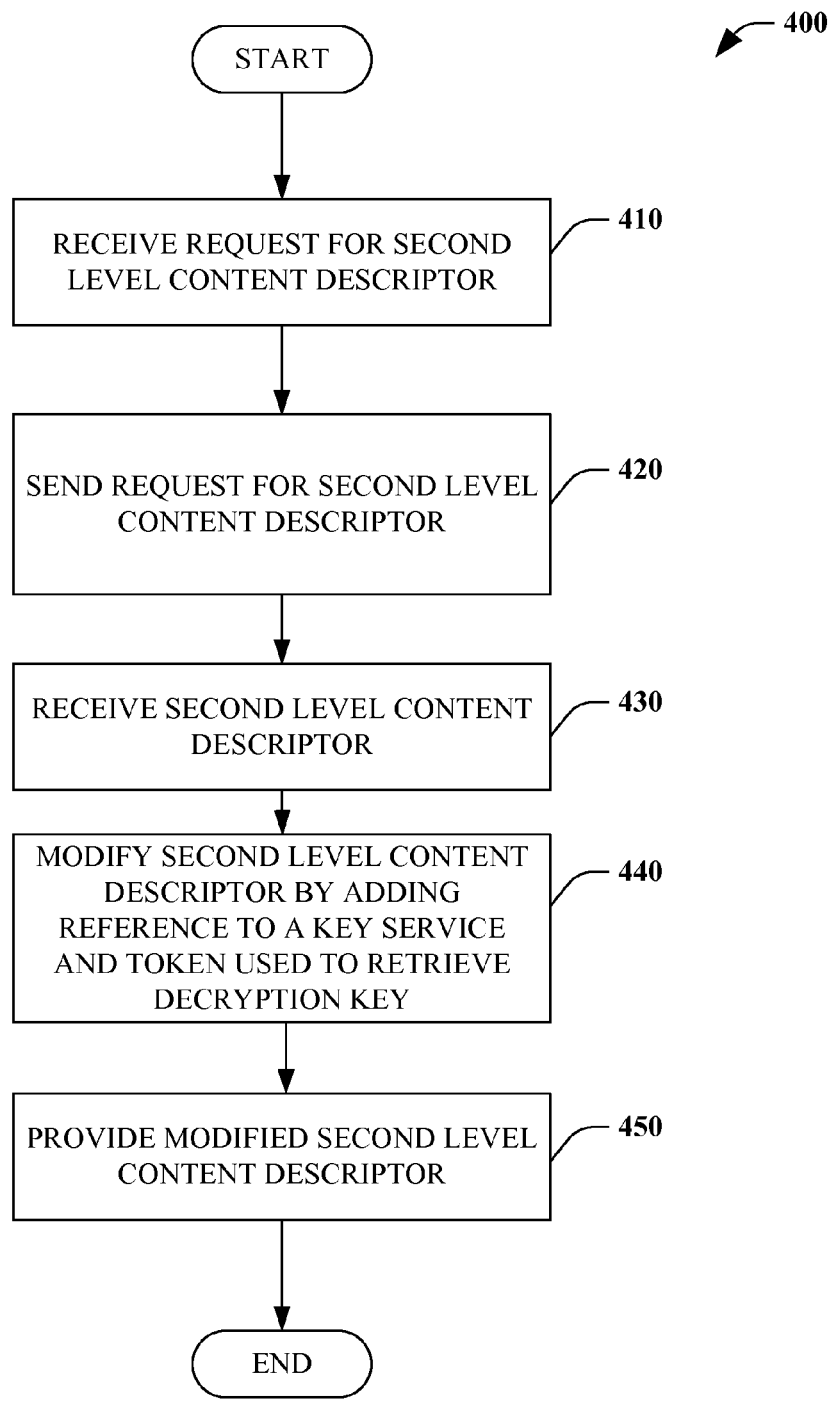
FIG. 4 is a flow diagram that illustrates an exemplary methodology of modifying a content descriptor.
Figure 5:
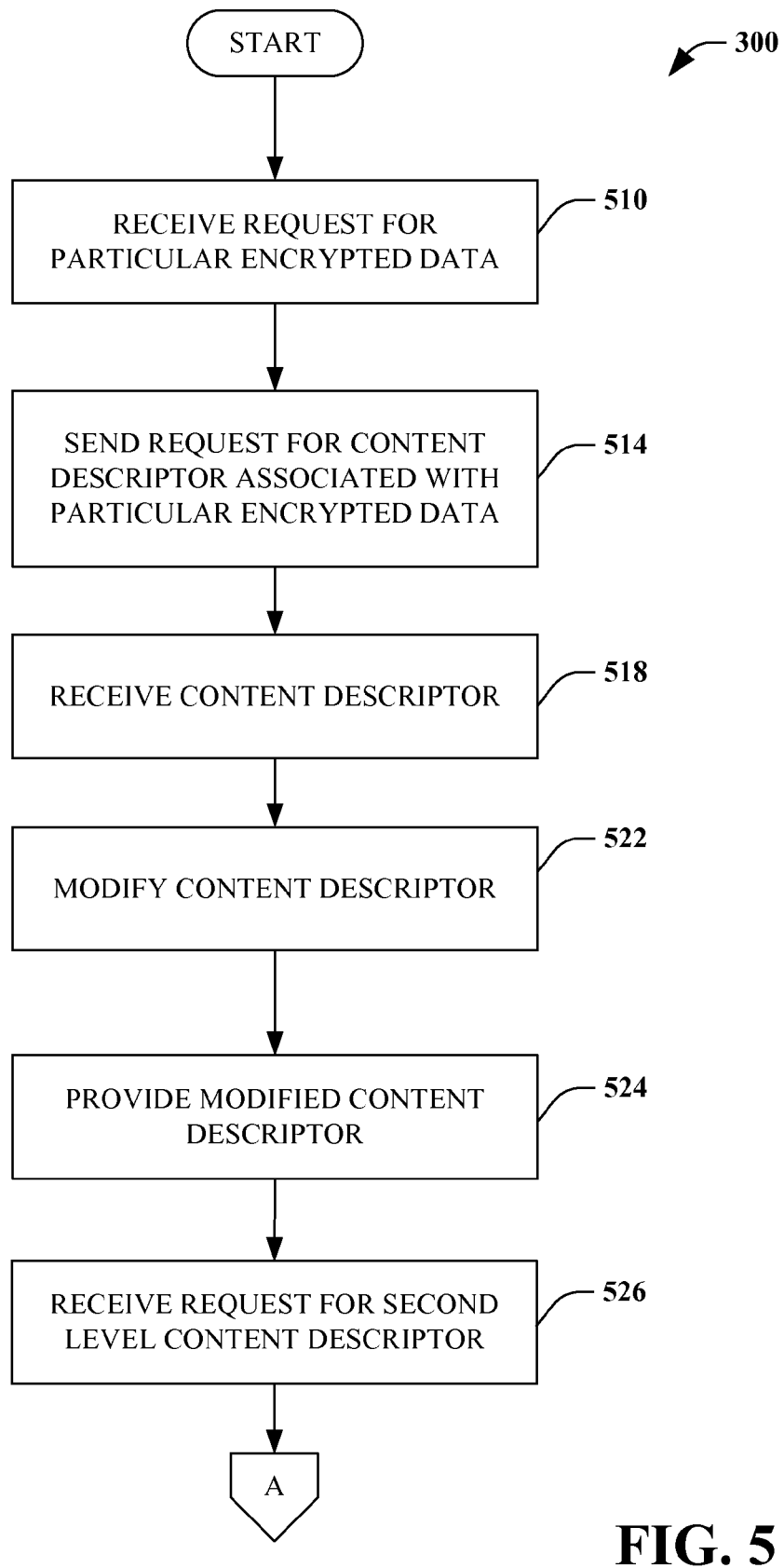
FIG. 5 is a flow diagram that illustrates an exemplary methodology of modifying a content descriptor.

FIGS. 3-5 illustrate exemplary methodologies relating to delivery of token-authenticated encrypted data. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 3, an exemplary methodology 300 of modifying a content descriptor is illustrated. In one exemplary embodiment, the methodology 300 is employed by a first content descriptor modification component 140 to facilitate delivery of token-based encrypted data.

At 310, a request for particular encrypted data (e.g., data stream) is received. In one exemplary embodiment, the request is received from an embedded audio/video player of a browser. For example, the request can include an identifier which is mapped to an encrypted data stream.

At 320, a request for a content descriptor associated with the particular encrypted data is sent, for example, to an encrypted content provider 130. At 330, in response to the request, a content descriptor (e.g., top level playlist) is received. This content descriptor (e.g., top level playlist) can include identifier(s) (e.g., URI(s)) of second level playlist(s)) associated with the particular encrypted data (e.g., data stream).

At 340, the content descriptor is modified by adding a reference to a service endpoint (e.g., a proxy server) and a token used to retrieve a decryption key used to decrypt the particular encrypted data. The identifier(s) included in the original content descriptor can be included as a parameter of the service endpoint provided in the modified content descriptor (e.g., top level playlist). At 350, the modified content descriptor can be provided to the player 110. For example, the reference to the service endpoint and the token can be interpreted by the player 110 as a second level playlist.

Next, FIG. 4 illustrates an exemplary methodology 400 of modifying a content descriptor. In one exemplary embodiment, the methodology 400 is employed by a second content descriptor modification component 150 to facilitate delivery of token-based encrypted data.

At 410, a request (e.g., for a second level playlist) can be received from a player 110. The request can be based upon the modified content descriptor received by the player 110 from the first content descriptor modification component 140. Accordingly, the request can include the token used to retrieve the decryption key and the identifier(s) included in the original content descriptor (e.g., second playlist URI(s)).

At 420, in response the request, a second level content descriptor can be requested (e.g., from the encrypted content provider 130). At 430, the second level content descriptor can be received.

Next, at 440, the second level content descriptor can be modified by adding a reference to a key service component along with the token used to retrieve the decryption key. At 450, the modified second level content descriptor can be provided (e.g., to the player 110).

Figure 6:
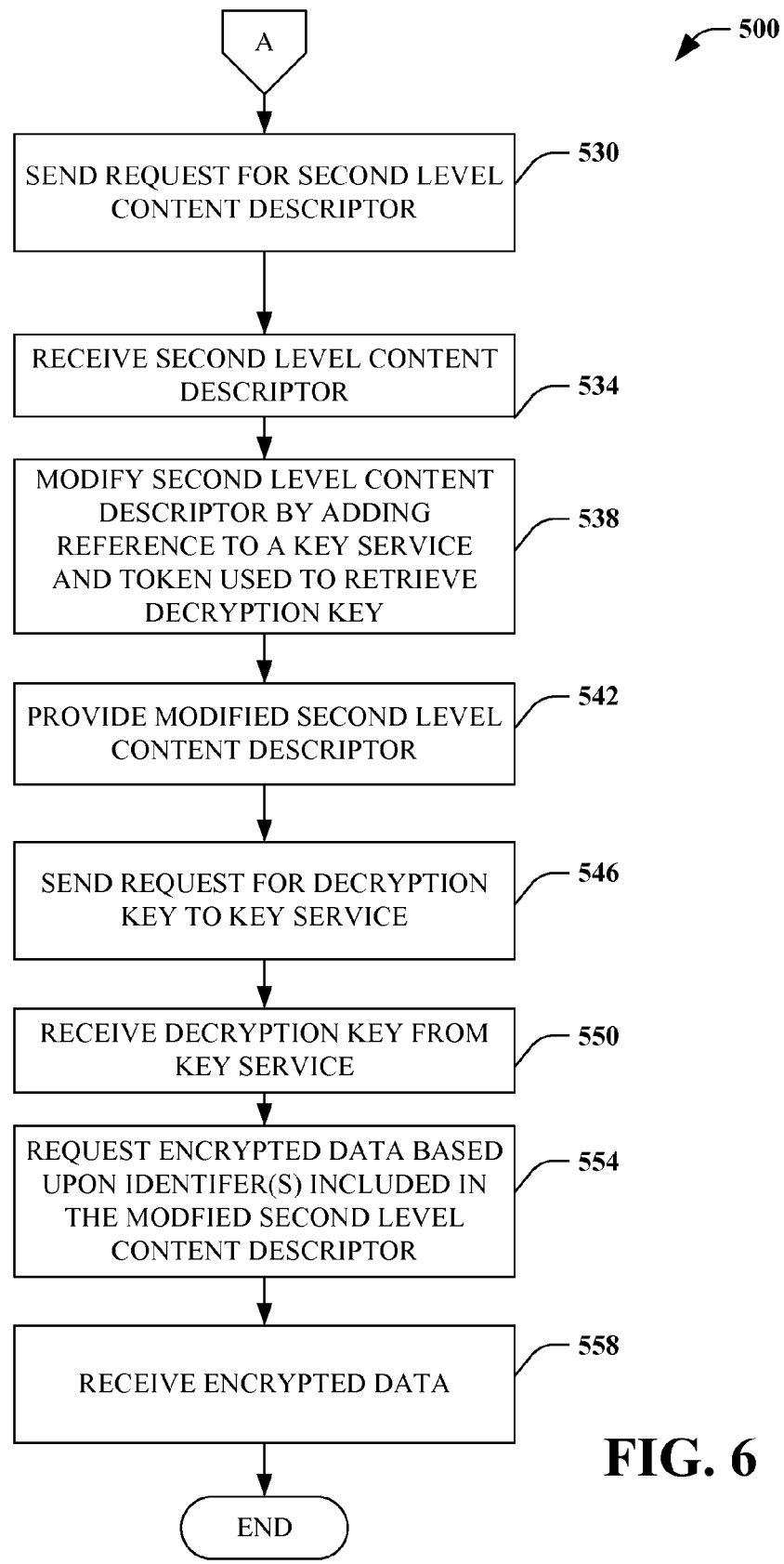
FIG. 6 is a flow diagram that further illustrates the exemplary methodology of FIG. 5.

Referring to FIGS. 5 and 6, an exemplary methodology 500 of modifying a content descriptor is illustrated. In one exemplary embodiment, the methodology 500 is employed to facilitate delivery of token-based encrypted data.

At 510, a request for particular encrypted data (e.g., data stream) is received. At 514, a request for a content descriptor associated with the particular encrypted data is sent, for example, to an encrypted content provider 130.

At 518, in response to the request, a content descriptor (e.g., top level playlist) is received. This content descriptor (e.g., top level playlist) can include identifier(s) (e.g., URI(s)) of second level playlist(s)) associated with the particular encrypted data (e.g., data stream).

At 522, the content descriptor is modified by adding a reference to a service endpoint (e.g., a proxy server) and a token used to retrieve a decryption key used to decrypt the particular encrypted data. The identifier(s) included in the original content descriptor can be included as a parameter of the service endpoint provided in the modified content descriptor (e.g., top level playlist). At 524, the modified content descriptor can be provided to the player 110 which can interpret the reference to the service endpoint and the token by the player 110 as a second level playlist.

At 526, a request (e.g., for a second level content descriptor) based upon the modified content descriptor can be received from a player 110. The request can include the token used to retrieve the decryption key and the identifier(s) included in the original content descriptor (e.g., second playlist URI(s)).

At 530, in response the request, a second level content descriptor can be requested (e.g., from the encrypted content provider 130). At 534, the second level content descriptor can be received.

Next, at 538, the second level content descriptor can be modified by adding a reference to a key service component along with the token used to retrieve the decryption key. At 542, the modified second level content descriptor can be provided (e.g., to the player 110).

At 546, the player 110 can send a request for the decryption key to the key service component 160. The request can include the token provided to the player 110 in the modified second level content descriptor.

At 550, the key service component 160 can provide the decryption key to the player 110. At 554, the player 110 can request the encrypted data from the encrypted data provider 130 based upon identifier(s) included in the modified second level playlist, and, at 558 receive the encrypted data from the encrypted data provider 130. The player 110 can utilize the decryption key to decrypt the received encrypted data.

While the subject disclosure has been described in the context of two level content descriptors (e.g., manifests), those skilled in the art will recognize that the subject disclosure is not limited to a two level contest descriptor scenario. For example, the subject disclosure can be employed in a single content descriptor (e.g., manifest) scenario and/or a multiple content descriptor scenario (e.g., three or more manifests) in which one or more content descriptor(s) are modified to facilitate exchange of a token for a decryption key for browser(s) that do not provide logic to manage a flow of the token.

Figure 7:
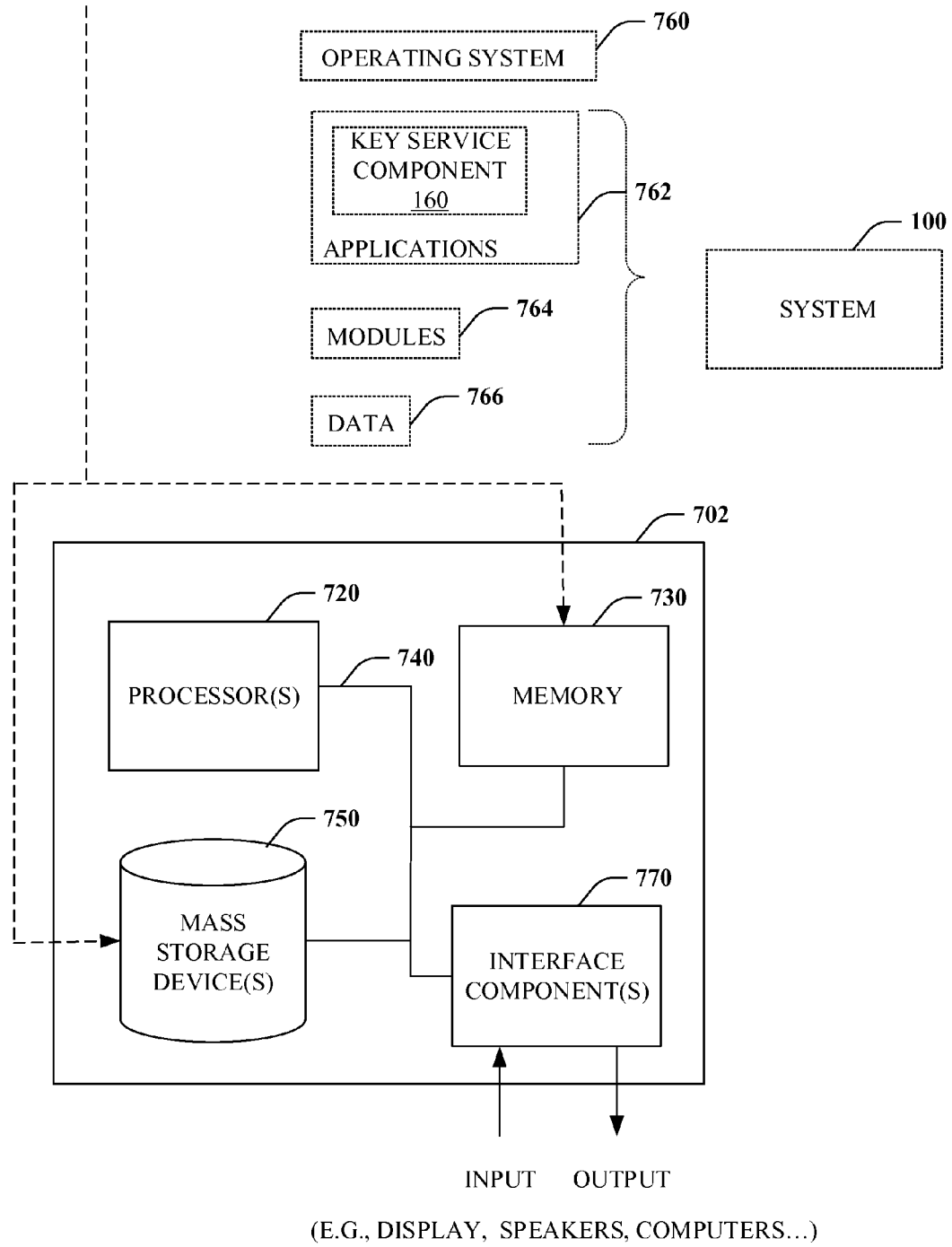
FIG. 7 is an exemplary computing system.

With reference to FIG. 7, illustrated is an example general-purpose computer or computing device 702 (e.g., desktop, laptop, tablet, watch, server, hand-held, programmable consumer or industrial electronics, set-top box, game system, compute node . . . ). The computer 702 includes one or more processor(s) 720, memory 730, system bus 740, mass storage device(s) 750, and one or more interface components 770. The system bus 740 communicatively couples at least the above system constituents. However, it is to be appreciated that in its simplest form the computer 702 can include one or more processors 720 coupled to memory 730 that execute various computer executable actions, instructions, and or components stored in memory 730.

The processor(s) 720 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 720 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 720 can be a graphics processor.

The computer 702 can include or otherwise interact with a variety of computer-readable media to facilitate control of the computer 702 to implement one or more aspects of the claimed subject matter. The computer-readable media can be any available media that can be accessed by the computer 702 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computer 702. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 730 and mass storage device(s) 750 are examples of computer-readable storage media. Depending on the exact configuration and type of computing device, memory 730 may be volatile (e.g., RAM), non-volatile (e.g., ROM, flash memory . . . ) or some combination of the two. By way of example, the basic input/output system (BIOS), including basic routines to transfer information between elements within the computer 702, such as during start-up, can be stored in nonvolatile memory, while volatile memory can act as external cache memory to facilitate processing by the processor(s) 720, among other things.

Mass storage device(s) 750 includes removable/non-removable, volatile/non-volatile computer storage media for storage of large amounts of data relative to the memory 730. For example, mass storage device(s) 750 includes, but is not limited to, one or more devices such as a magnetic or optical disk drive, floppy disk drive, flash memory, solid-state drive, or memory stick.

Memory 730 and mass storage device(s) 750 can include, or have stored therein, operating system 760, one or more applications 762, one or more program modules 764, and data 766. The operating system 760 acts to control and allocate resources of the computer 702. Applications 762 include one or both of system and application software and can exploit management of resources by the operating system 760 through program modules 764 and data 766 stored in memory 730 and/or mass storage device (s) 750 to perform one or more actions. Accordingly, applications 762 can turn a general-purpose computer 702 into a specialized machine in accordance with the logic provided thereby. In one example, application 762 includes key service component 160.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 762, and include one or more modules 764 and data 766 stored in memory and/or mass storage device(s) 750 whose functionality can be realized when executed by one or more processor(s) 720.

In accordance with one particular embodiment, the processor(s) 720 can correspond to a system on a chip (SOC) or like architecture including, or in other words integrating, both hardware and software on a single integrated circuit substrate. Here, the processor(s) 720 can include one or more processors as well as memory at least similar to processor(s) 720 and memory 730, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 702 also includes one or more interface components 770 that are communicatively coupled to the system bus 740 and facilitate interaction with the computer 702. By way of example, the interface component 770 can be a port (e.g., serial, parallel, PCMCIA, USB, FireWire . . . ) or an interface card (e.g., sound, video . . . ) or the like. In one example implementation, the interface component 770 can be embodied as a user input/output interface to enable a user to enter commands and information into the computer 702, for instance by way of one or more gestures or voice input, through one or more input devices (e.g., pointing device such as a mouse, trackball, stylus, touch pad, keyboard, microphone, joystick, game pad, satellite dish, scanner, camera, other computer . . . ). In another example implementation, the interface component 770 can be embodied as an output peripheral interface to supply output to displays (e.g., LCD, LED, plasma . . . ), speakers, printers, and/or other computers, among other things. Still further yet, the interface component 770 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
   a processor; and
   a memory comprising:
      a second content descriptor modification component configured to:
         receive a request, the request comprising a token used to retrieve a decryption key to decrypt encrypted data and an identifier of a content descriptor;
         retrieve the content descriptor based upon the request, the content descriptor comprising an identifier of the encrypted data;
         modify the content descriptor by adding a reference to a key service to obtain a key to decrypt the encrypted data with the token embedded as a parameter to be provided to the key service to obtain the key; and
         provide the modified content descriptor to a player embedded within a browser and/or an application that does not provide logic to manage a flow of the token.

2. The system of claim 1, wherein the content descriptor comprises metadata associated with the encrypted data.

3. The system of claim 1, wherein the identifier of the content descriptor is a Uniform Resource Identifier of a second level playlist associated with the encrypted data.

4. The system of claim 1, the memory further comprising a first content descriptor modification component configured to receive a top content descriptor comprising an identifier of the encrypted data, the first content descriptor modification component further configured to modify the top content descriptor by adding a reference to a proxy server and the token used to retrieve the key, the first content descriptor modification component further configured to provide the modified top content descriptor to a player.

5. The system of claim 4, wherein the request is based upon the modified top content descriptor provided by the first content descriptor modification component.

6. The system of claim 4, wherein the first content descriptor modification component is configured to determine that the browser does not provide logic to manage a flow of the token.

7. The system of claim 1, wherein the content descriptor is in Extended M3U format.

8. A method, comprising:
receiving a request for a playlist file, the request comprising a token used to retrieve a decryption key to decrypt an encrypted data;
retrieving the requested playlist file, the playlist file comprising an identifier of the encrypted data;
modifying the playlist file by adding a reference to a key service to obtain a key to decrypt the encrypted data with the token embedded as a parameter to be provided to the key service to obtain the key; and
providing the modified playlist file to a client device embedded within a browser and/or an application that does not provide logic to manage a flow of the token.

9. The method of claim 8, wherein the encrypted data comprises at least one of audio, video or information about a presentation.

10. The method of claim 8, wherein the identifier of the encrypted data is a Uniform Resource Identifier of a second level playlist associated with the encrypted data.

11. The method of claim 8, wherein the content descriptor is in Extended M3U format.

12. The method of claim 8, further comprising:
receiving a top playlist file comprising an identifier of the encrypted data;
modifying the top playlist file by adding a reference to a proxy server and the token; and,
providing the modified top playlist file to the client device.

13. A system, comprising:
a processor; and
a memory comprising:
a first content descriptor modification component configured to:
receive a content descriptor comprising an identifier of encrypted data;
modify the content descriptor by adding a reference to a service endpoint and a token used to retrieve a decryption key to decrypt the encrypted data;
provide the modified content descriptor to a player embedded within a browser and/or an application; and
determine that the browser and/or the application does not provide logic to manage a flow of the token.

14. The system of claim 13, wherein the content descriptor is in Extended M3U format.

15. The system of claim 13, wherein the player is embedded within the browser, and the first content descriptor modification component is configured to determine that the browser does not provide logic to manage a flow of the token.

16. The system of claim 13, wherein the first content descriptor modification component is further configured to receive a request for the encrypted data from the player.

* * * * *